M. P. McCARTHY.
GAITING STRAP.
APPLICATION FILED DEC. 11, 1919.

1,354,410. Patented Sept. 28, 1920.

WITNESSES
Oliver W. Holmes
J. C. Ledbetter

INVENTOR
MAURICE P. McCARTHY.
BY Munn & Co
ATTORNEYS

UNITED STATES PATENT OFFICE.

MAURICE PATRICK McCARTHY, OF HARTFORD, CONNECTICUT.

GAITING-STRAP.

1,354,410.  Specification of Letters Patent.  Patented Sept. 28, 1920.

Application filed December 11, 1919. Serial No. 344,212.

*To all whom it may concern:*

Be it known that I, MAURICE P. MCCARTHY, a citizen of the United States, and a resident of Hartford, in the county of Hartford and State of Connecticut, have invented a new and Improved Gaiting-Strap, of which the following is a full, clear, and exact description.

This invention relates to harness and more particularly to harness parts known as gaiting straps used in training horses for the race track.

Primarily it is a broad object of my invention to provide means for facilitating the breaking and training of young horses to handle themselves properly in the shafts of the trotting sulky, and to provide means for restraining the horse from side movements or lateral trotting movements so prevalent in the nature of horses when they are first taken up for training.

Further, it is an object to provide the aforesaid means in the nature of a new and useful gaiting strap which is convenient in application, strong and efficient in use, and which will positively function to forcibly restrain the horse from swinging to one side during his course of training.

The use of gaiting straps or equivalent devices is not entirely new as it is usually the custom with horse trainers to employ some form of strap or heavy cord with one end thereof attached to the front end of the shafts and the other end thereof fixed to the cross bar of the shaft. When the strap is drawn very taut and properly adjusted it forcibly restrains the horse from side movements and causes his step to be alined, making the horse track, that is to say, forcing the horse to so travel either slow gaits or fast gaits as to cause his hind feet to follow in perfect alinement with his fore feet. In presenting my invention for the beneficent use in the horse training industry I have in mind so improving and constructing a gaiting strap as will enable it to be quickly fastened on the shaft of a sulky or other vehicle and eliminate the great inconvenience and unreliability encountered by using straps and ropes or makeshifts as is so prevalent around the horse training quarters of race tracks.

In constructing a gaiting strap in accordance with the concepts of my invention I employ an adjustable clamp ring fastened to one end of a gaiting strap. The other end of the gaiting strap is provided with an attachment loop. And the completed device embodies adjustable means which renders the use of a gaiting strap very convenient and adjustable so that it may be mounted upon almost any conventional type sulky in present day use around horse training quarters.

I have chosen to illustrate my invention by showing the adjustable gaiting strap mounted on a shaft of a racing sulky or other vehicle. It is to be understood that variations in design or construction, as long as made in conformity with the appended claims, come within the purview of my invention.

Figure 1 of the drawings illustrates a plan view of a pair of vehicle shafts with the animal to be trained positioned in the shafts and a gaiting strap mounted thereupon for the purpose of restraining the animal from side swings.

Figure 1:
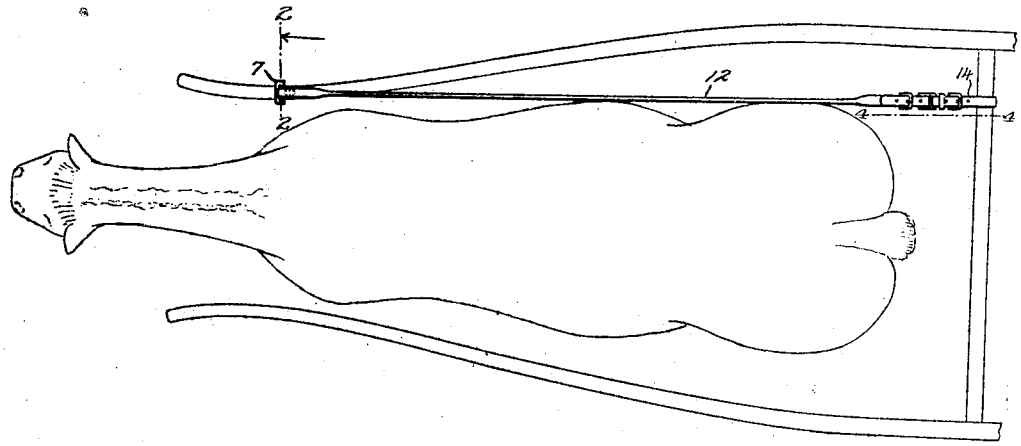

Referring now more particularly to the drawings for the detailed description of the invention, the numeral 7 points out an open ring constructed in the form of a clamp having ears through which a clamp screw 8 is threaded. The clamp screw can be rotated to close or open the clamp ring 7. The loop 9 is made integral on the clamp ring for the purpose of connecting the gaiting strap with the clamp ring. The clamp ring is preferably covered with leather or other material to prevent the chafing or marring of the sulky shafts.

A gaiting strap 12 has one end thereof permanently joined to the ring by fastening said gaiting strap to the loop 9. The gaiting strap is preferably made round or oval in cross section for the major part of its length in order that there will be no sharp corners or edges which would contact and unduly rub the side of the animal. The other end of the gaiting strap 12 is provided with a buckle 13 where the end of the gaiting strap is passed through the buckle and adapted to loop over a roller yoke and be secured in said buckle 13.

Figure 4:
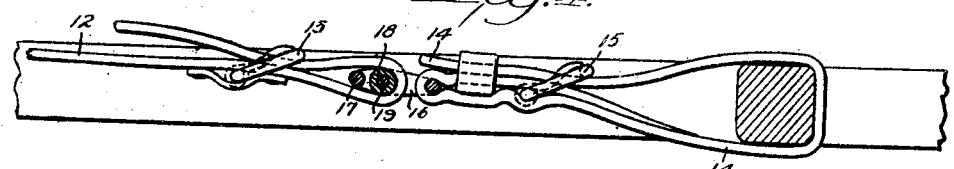
Fig. 4 illustrates a view as developed on the line 4—4 of Fig. 1 in order to illustrate the structure of the attachment loop.
Figure 5:
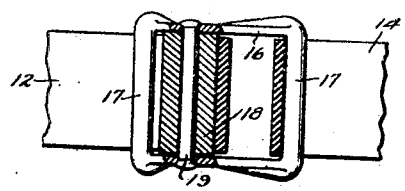
Fig. 5 shows a plan view of a roller yoke or attachment fixture used for the purpose of adjustably joining the gaiting strap with the attachment loop.

An attachment loop 14 is constructed in accordance with the design shown in Fig. 4 and provided with a buckle 15. The attachment loop is permanently joined with a roller yoke 16. The roller yoke 16 is preferably formed of a single piece of material with end bars 17, and having a roller 18 carried on a pintle 19 with the roller spaced somewhat closer to one of the bars than the other. It is seen, therefore, that the attachment loop provides the flexible strap 14 permanently joined to the roller yoke 16.

Figure 2:
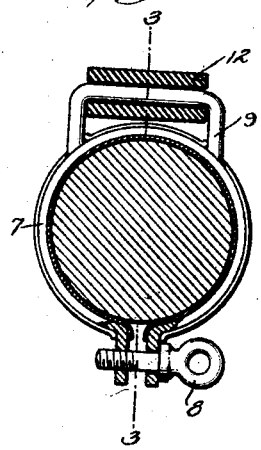
Fig. 2 shows a cross sectional view taken upon the line 2—2 of Fig. 1 in order to illustrate a particular form of adjusted clamp ring.
Figure 3:
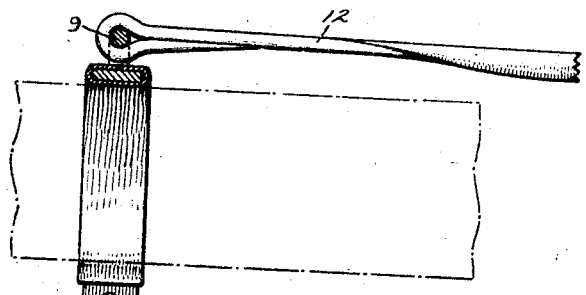
Fig. 3 illustrates a cross sectional view taken on the plane of section 3—3 of Fig. 2.

In mounting the gaiting strap on vehicle shafts it is necessary to apply the clamp ring 7 to one of the shafts as shown in Fig. 2 and pressure will be brought to bear on the open ring by the proper use of the clamp screw 8. In this manner the leather covered clamp ring 7 is permanently and dependably secured to the front end of the shaft as shown in Fig. 1. The attachment loop is next passed over the cross bar of the shaft and given a number of wraps therearound or simply looped over the cross bar as shown in Fig. 4. The rear end of the gaiting strap is then passed over the roller 18 and drawn taut and fastened in the buckle 13. After the gaiting strap is mounted on the shaft it can then be drawn still tighter by properly adjusting the rear end of the gaiting strap over the roller 18 when the animal is placed in the shafts as shown in Fig. 1. The proper alinement of the gaiting strap can be obtained by making such adjustments as will cause the gaiting strap 12 to take up a closed position to the side of the animal when he is centrally alined within the shafts.

Considerable strains and exertions occur throughout the harness and equipment of horse training apparatus and the device should necessarily be constructed of substantially heavy leather. It is pointed out that the roller yoke 17 is an adaptation of similar devices now used on harness with the exception that it is provided with a bar 17 made on each end of the yoke. Heretofore it has been the practice to employ roller yokes having only one end bar and should the roller 18 or pintle 19 break or be pulled from the yoke it would free the strap to become entangled in the feet of the running animal. It is pointed out in this case that the front cross bar 17 will immediately catch the gaiting strap 12 in case the roller 18 or pintle 19 should become broken or pulled out and thus avoid the danger incident to loose straps dangling from the shafts of a vehicle drawn by an animal traveling rapid paces.

Having thus described my invention, what I claim as new and desire to secure by Letters Patent is:

1. A gaiting strap to restrain a horse undergoing training from side swinging in the shafts of a training sulky, said gaiting strap comprising a flexible member, a clamp fixed to one end of the flexible member, a loop made on the other end of the flexible member, a roller yoke confined in the loop, and an attachment loop fastened to the roller yoke.

2. A gaiting strap to restrain a horse being trained from side swinging in the shafts of a sulky, comprising a flexible member adapted to have one end thereof fixed to the front end of the sulky shaft, a loop made on the other end thereof, a roller confined in the loop, a frame to carry the roller, and a strap attached to the frame for the purpose of securing the rear end of the gaiting strap to the frame of a sulky.

MAURICE PATRICK McCARTHY.